(12) United States Patent
Yamaguchi et al.

(10) Patent No.: US 8,875,403 B2
(45) Date of Patent: Nov. 4, 2014

(54) COATING REMOVAL TOOL USED FOR OPTICAL FIBER AND METHOD OF REMOVING COATING

(71) Applicant: Fujikura Ltd., Tokyo (JP)

(72) Inventors: Takashi Yamaguchi, Sakura (JP); Kazuhiro Takizawa, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 14/039,974

(22) Filed: Sep. 27, 2013

(65) Prior Publication Data

US 2014/0026717 A1    Jan. 30, 2014

Related U.S. Application Data

(63) Continuation of application No. PCT/JP2012/058206, filed on Mar. 28, 2012.

(30) Foreign Application Priority Data

Mar. 30, 2011  (JP) ................ 2011-075278

(51) Int. Cl.
*G02B 6/245* (2006.01)
*H02G 1/12* (2006.01)
*G02B 6/38* (2006.01)

(52) U.S. Cl.
CPC .............. *G02B 6/245* (2013.01); *G02B 6/3866* (2013.01)
USPC .............................................. 30/90.1; 81/9.4

(58) Field of Classification Search
USPC ........... 81/9.4, 9.41, 9.42, 9.43, 9.44; 30/90.1
See application file for complete search history.

(56) References Cited

U.S. PATENT DOCUMENTS 1,490,459 A * 4/1924 Fergusson ................... 30/90.1
4,271,729 A * 6/1981 Perrino et al. .............. 30/90.1
4,409,713 A * 10/1983 Johnston ..................... 29/33 M (Continued)

FOREIGN PATENT DOCUMENTS

DE          3436668 A1    4/1986
DE    102008046826 B3    1/2010

(Continued)

OTHER PUBLICATIONS

International Search Report of PCT/JP2012/058206 dated May 22, 2012.

(Continued)

*Primary Examiner* — David B Thomas
(74) *Attorney, Agent, or Firm* — Sughrue Mion, PLLC (57) ABSTRACT

A coating removal tool used for an optical fiber includes: a base; and a pair of arm members extending in one direction from the base. Also, the arm members, each of which comprises an elastically deformable deformation portion on a base side, and an operation portion which is closer to a tip end side than the deformation portion, contact portions in a wedge shape are provided on the inner sides of operation portions, respectively, the inner sides opposing to each other so that tip edges of contact portions oppose to each other, and grip portions are provided outside the operation portions, respectively, and a coating of an optical fiber is configured to be removed by pulling out the optical fiber in a state where the tip edges of the contact portions are brought into contact with the optical fiber disposed along an extending direction of the arm members.

7 Claims, 6 Drawing Sheets (56) References Cited

U.S. PATENT DOCUMENTS

| | | | |
|---|---|---|---|
| 6,708,749 B2* | 3/2004 | McLeod | 156/763 |
| 6,754,960 B1* | 6/2004 | Shiraishi et al. | 30/90.6 |
| 6,763,872 B2* | 7/2004 | Beffroy et al. | 156/714 |
| 7,398,599 B2* | 7/2008 | Shiraishi et al. | 30/90.1 |
| 2004/0181945 A1* | 9/2004 | Shiraishi et al. | 30/90.1 |
| 2006/0265881 A1 | 11/2006 | Serrano et al. | |
| 2011/0138629 A1* | 6/2011 | Liu | 30/90.1 |
| 2011/0173817 A1* | 7/2011 | Barnes et al. | 30/90.1 |

FOREIGN PATENT DOCUMENTS

| | | | |
|---|---|---|---|
| EP | 0232003 A2 | 8/1987 |
| JP | 57-076503 A | 5/1982 |
| JP | 02-142803 U | 12/1990 |
| JP | 10-319249 A | 12/1998 |
| JP | 11-084140 A | 3/1999 |
| JP | 11-104367 A | 4/1999 |
| JP | 2006-178289 A | 7/2006 |
| JP | 2008-542841 A | 11/2008 |
| JP | 2010-008590 A | 1/2010 |
| WO | 2006/130572 A2 | 12/2006 |

OTHER PUBLICATIONS

European Search Report in European Application No. 12763919.3 mailed Jul. 31, 2014.

* cited by examiner

COATING REMOVAL TOOL USED FOR OPTICAL FIBER AND METHOD OF REMOVING COATING

CROSS REFERENCE TO RELATED APPLICATIONS

This application is a continuation application based on a PCT Patent Application No. PCT/JP2012/058206, filed Mar. 28, 2012, whose priority is claimed on Japanese Patent Application No. 2011-075278, filed Mar. 30, 2011, the entire content of which are hereby incorporated by reference.

BACKGROUND OF THE INVENTION

1. Field of the Invention

The present invention relates to a coating removal tool used for an optical fiber which removes a coating from a terminal portion of the optical fiber and a method of removing a coating.

2. Description of the Related Art

When connecting optical fibers each other, there is a case of removing a coating from a terminal portion of the optical fiber as a pretreatment.

On-site, especially, removal of the coating is mainly performed using a coating removal tool used for an optical fiber (stripper).

As a coating removal tool used for an optical fiber, various forms have been proposed. However, as a material used for a removal blade which removes the coating, a metal is generally used to improve durability.

In addition, as described in Japanese Unexamined Patent Application, First Publication No. H11-104367, a mechanical portion used to operate the removal blade is generally constituted from a plurality of components.

By the way, the above-mentioned coating removal tool used for an optical fiber uses a metal for the removal blade and has a complicated structure, such that the removal tool is expensive.

Accordingly, there is a problem that the quantity of removal tools is limited and work is delayed on-site.

The invention is made in view of the circumstances, and the invention aims to provide a coating removal tool used for an optical fiber which can be mass-produced at a low manufacturing cost due to its simple structure and a method of removing a coating therefor.

SUMMARY

In order to solve the above-mentioned problems, a coating removal tool used for an optical fiber according to an aspect of the present invention includes a base; and a pair of arm members extending in one direction from the base. The arm members, each of which comprises an elastically deformable deformation portion on a base side, and an operation portion which is closer to a tip end side than the deformation portion, contact portions in a wedge shape are provided on inner sides of operation portions, respectively, the inner sides opposing to each other so that tip edges of the contact portions oppose to each other, and grip portions are provided outside the operation portions, respectively, and the tip edges of the contact portions are used a coating of the optical fiber by pulling out the optical fiber in a state where the tip edges of the contact portions are brought into contact with the optical fiber disposed along an extending direction of the arm members, and thereby removing.

According to the coating removal tool used for an optical fiber, the pair of arm members is made to be elastically deformable, and a simple structure is applied that a contact portion in a wedge shape is provided at the tip end side of the arm members, and thereby it is possible to provide the coating removal tool used for an optical fiber at a low cost.

In the coating removal tool used for an optical fiber according to the aspect of the invention, the optical fiber may be led out from an optical cable and attached to an outer coat gripping member may, the gripping member gripping an outer coat of the optical cable, and a slide portion may be provided on the base, the slide portion being configured to cause the outer coat gripping member to slide in a pull-out direction of the optical fiber.

It is possible to apply the coating removal tool used for an optical fiber of this configuration to an optical cable gripped by the outer coat gripping member used in the optical connector.

In the coating removal tool used for an optical fiber according to the aspect of the invention, the optical fiber may be an optical fiber held by an optical fiber holder, and the slide portion may be provided on the base, the slide portion may be configured to cause the optical fiber holder to slide in the pull-out direction of the optical fiber.

It is possible to apply the coating removal tool used for an optical fiber of this configuration to the optical fiber held by the optical fiber holder.

In the coating removal tool used for an optical fiber according to the aspect of the invention, a stopper may be provided on the base, the stopper being configured to position the outer coat gripping member or the optical fiber holder at a starting position of a coating removal, and the outer coat gripping member and the optical fiber holder causing the slide portion to slide.

Accordingly, a coating is removed from a state where the outer coat gripping member or the optical fiber holder is brought into contact with the stopper, and thereby it is possible to make the thickness of coating which coats bare optical fiber to be constant according to a position of the stopper.

Further, in order to solve the above problems, another aspect of the present invention provides a method of removing a coating of an optical fiber, including, the step of: disposing, between a pair of arm members extending in one direction from the base, an optical fiber along an extending direction of the arm members; gripping grip portions provided outside operation portions, each operation portion being formed closer to a tip end side than an elastically deformable deformation portion on a base side of the pair of arm members; deforming deformation portions so that tip edges of contact portions in a wedge shape come close to each other through the optical fiber, the contact portions being provided on sides of operation portions, respectively, so as to oppose each other; allowing tip edges of the contact portions to come into contact with the optical fiber; and removing a coating of the optical fiber by pulling out the optical fiber in a state where the contact portions are brought into contact with the optical fiber.

According to the method of removing a coating, a pair of arm members is made to be elastically deformable, and a simple structure where a contact portion in a wedge shape is provided at the tip end side of the arm members is employed, and thereby it is possible to remove the coating of the optical fiber at a low cost.

According to the aspects of the invention, a low-cost coating removal tool used for optical fiber and a method of removing a coating can be provided.

DETAILED DESCRIPTION OF THE PREFERRED EMBODIMENTS

First Embodiment

Hereinafter, embodiments of the present invention will be described in detail referring to drawings.

A stripper 10 of the embodiment is a coating removal tool used for an optical fiber which removes a coating of an optical fiber 61 extending from the terminal portion of an optical fiber cable 60 (refer to FIG. 4) and exposes the a bare optical fiber 61a.

The bare optical fiber 61a is not particularly limited, and various types of optical fibers which are known in the related art, for example, a single mode optical fiber, a multi-mode optical fiber, a polarization-maintaining optical fiber, a holey fiber, and the like, can be applied thereto.

In addition, the outer diameter of the bare optical fiber 61a is not limited, but an bare optical fiber having a diameter of 125 μm which is generally in wide use is preferably used.

The optical fiber cable 60 is used as a drop cable and a so-called an indoor cable for indoor wiring, and an illustrated example illustrates a single core equipped with only one optical fiber 61.

As the optical fiber cable 60 which is changed to the optical fiber 61, a configuration may also be adapted in which a coated optical fiber, also referred to as an optical fiber core having a single core, (an optical fiber in a configuration where a bare optical fiber is coated (doped) by a resin coating material) is used.

In addition, the outer coat gripping member 51 is fixed to the terminal portion of the optical fiber cable 60.

Collectively, these are referred to as a connector-attached optical fiber 50.

In addition, at both side surfaces of the outer coat gripping member 51, a guide protrusion 52 corresponding to a guide groove 7 to be described below is formed along the extending direction of the optical fiber cable 60.

Figure 1:
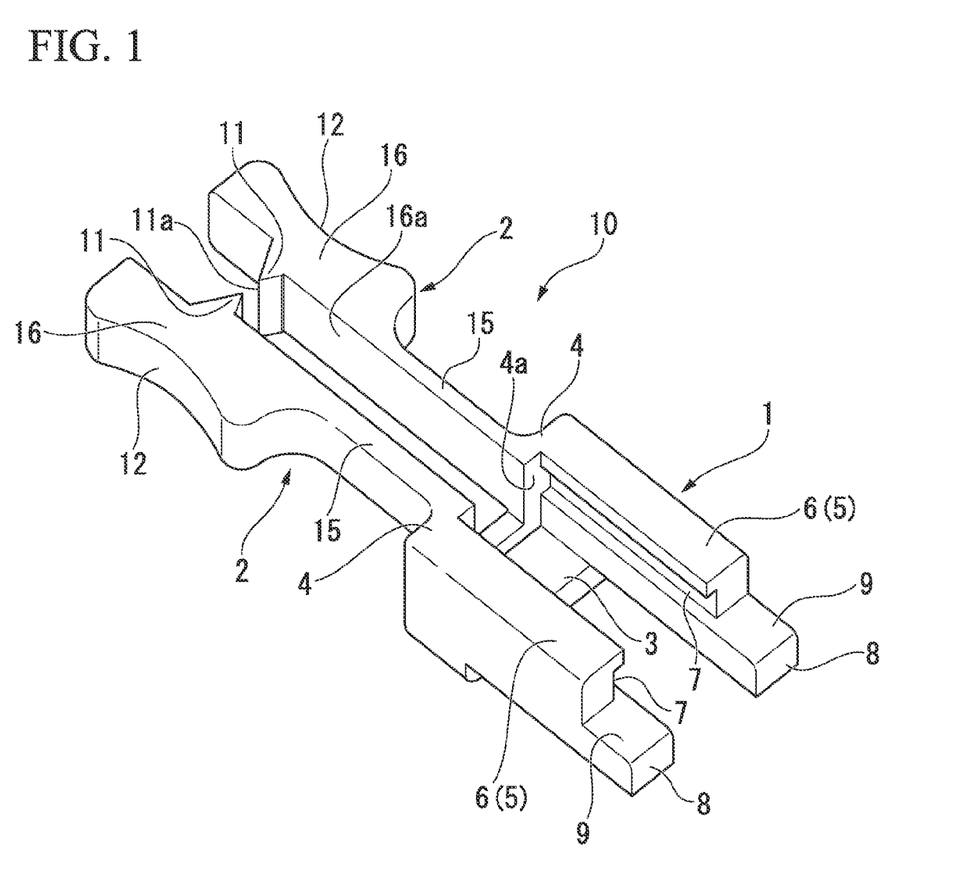
FIG. 1 is a perspective view of a stripper of a first embodiment of the present invention.
Figure 2:
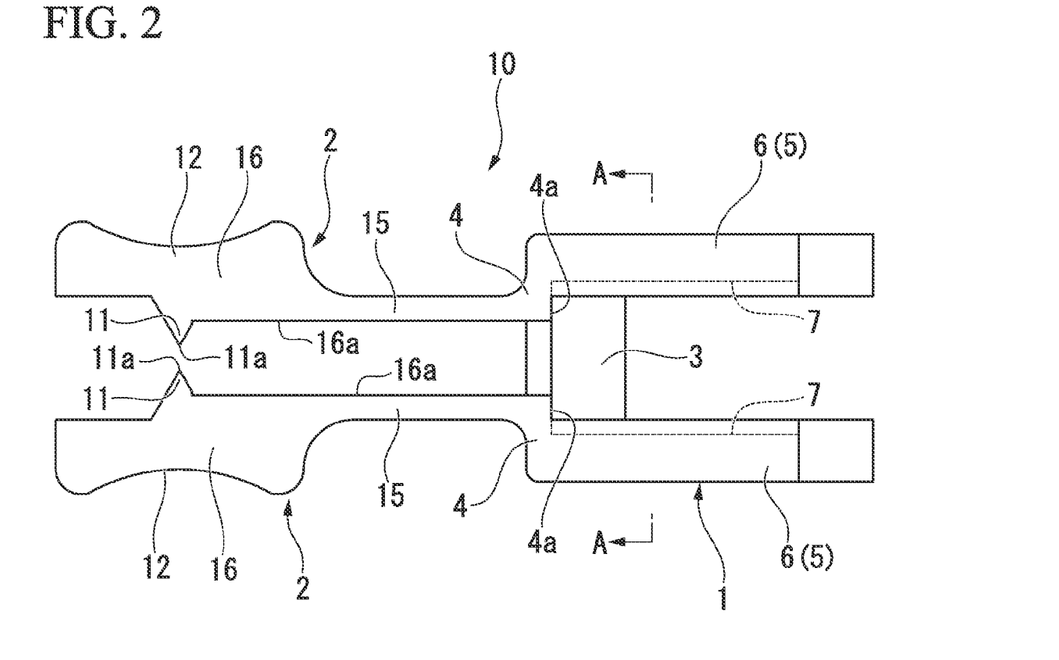
FIG. 2 is the plan view of a stripper.

As illustrated in FIGS. 1 and 2, the stripper 10 of the embodiment includes a main body 1 and a pair of arm members 2 extending in one direction from the main body 1, and these are integrally formed.

For example, the stripper 10 is formed by polycarbonate resin, but not limited thereto, and various types of resins may be used as long as they are a resin with an appropriate elasticity.

Hereinafter, the extending direction (longitudinal direction) of the arm members 2 is simply referred to as the longitudinal direction.

The following describes the stripper 10 by defining a side of the arm members 2 as the front and a side of the main body 1 as the rear.

For example, in FIG. 2, the left side is defined as the front, and the right side is defined as the rear.

Figure 3:
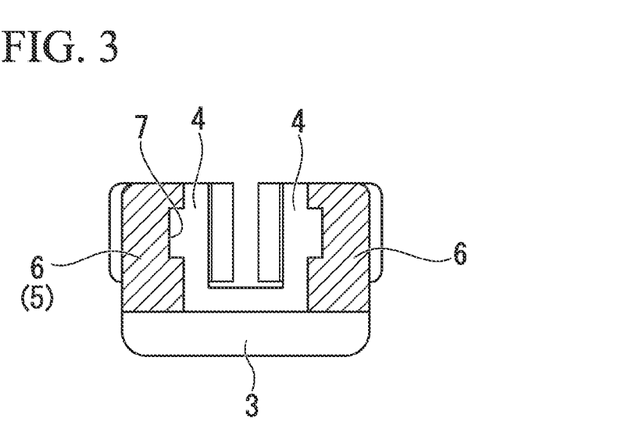
FIG. 3 is an A-A cross-sectional view of FIG. 2.

In addition, in FIG. 3, the upper side is described as the top, and the lower side is described as the bottom.

The main body 1 is configured to have a stand portion 3 which is in a rectangular shape seen from the plane view and has a thickness in a vertical direction, a pair of wall portions 4 and 4 extending upward from the front end of the stand portion 3, and a slide portion 5 extending rearward from the wall portions 4.

The wall portions 4 are portions in a rectangular plate shape having a thickness in a forward and backward direction.

As illustrated in FIG. 3, the wall portions 4 are formed at right and left sides in a space.

A space between two wall portions 4 is a space for extension of the optical fiber 61 when an outer coat gripping member 51 of the connector-attached optical fiber 50 is incorporated in the stripper 10.

The slide portion 5 loads the outer coat gripping member 51. The slide portion 5 is a portion causing the outer coat gripping member 51 to slide, and includes a pair of guide walls 6 used to determine a pull-out direction of the outer coat gripping member 51.

Each guide wall 6 extends rearward from both side end portions of the wall portion 4.

Guide grooves 7 which oppose to each other are formed on opposing surfaces of the guide walls 6.

The guide groove 7 is a groove in a U-shaped section, which extends in a forward and backward direction, and is formed so that each groove bottom portion may oppose to each other so as to be parallel.

At the rear end of the guide wall 6, by cutting the upper portion, the rear end bottom portion of the guide wall 6 protrudes, and the upper surface of a protrusion portion 8 is a guide surface 9.

Figure 4:
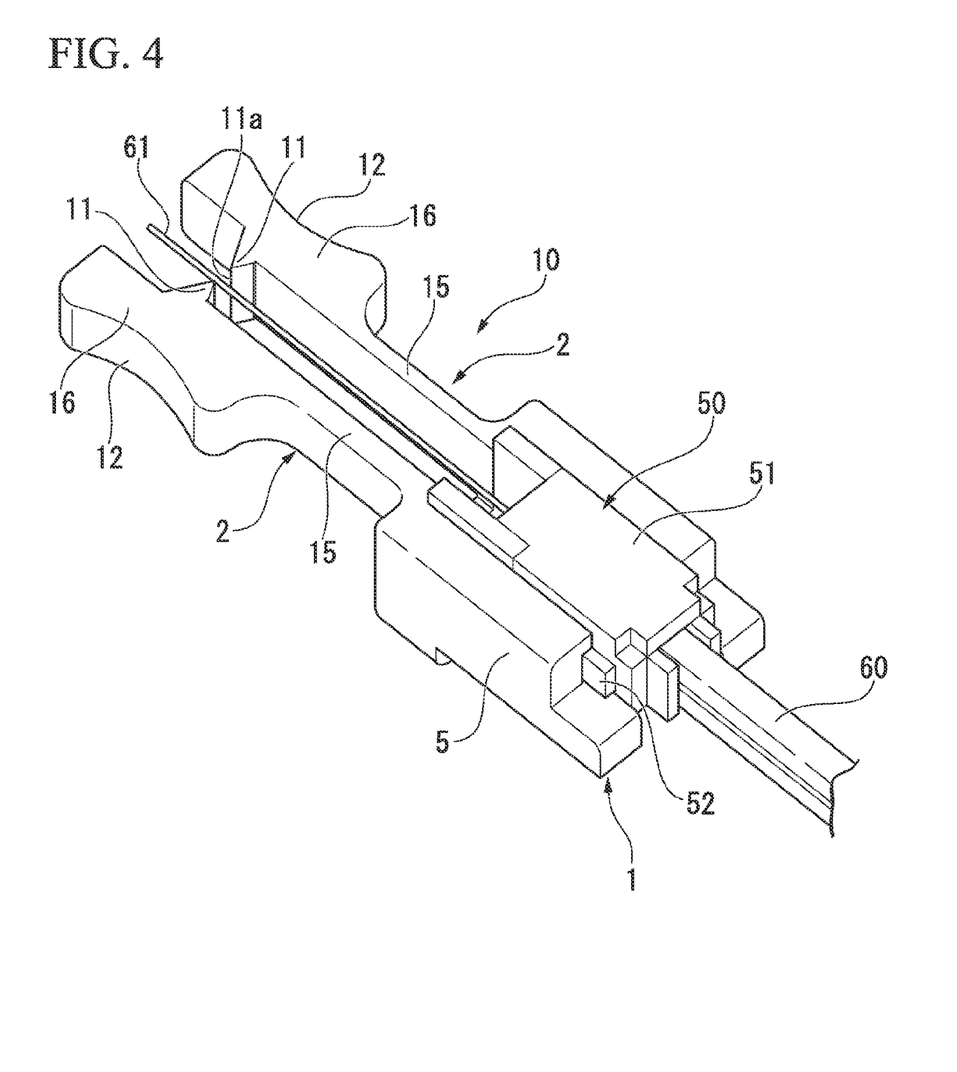
FIG. 4 is a perspective view illustrating a state that a connector-attached optical fiber is incorporated in the stripper.

Furthermore, at a front end of the guide groove 7, a rear surface 4a of the wall portion 4, as illustrated in FIG. 4, when the connector-attached optical fiber 50 is inserted along the guide groove 7, functions as a stopper which is in contact with the front end of the outer coat gripping member 51.

The pair of arm members 2 and 2 is a member in a long plate shape extending forward from each wall portion 4 of the main body 1.

Each arm member 2 has a plate thickness direction in horizontal direction and is disposed such that a surface of each arm member 2 is opposed to the other.

In other words, a cross-sectional shape of the arm member 2 is in a rectangular shape of which the vertical direction is longer than the horizontal direction.

The arm member 2 includes a deformation portion 15 of the main body 1 side and the operation portion 16 of the tip end side.

The deformation portion 15 is formed to have a short width size of a direction (horizontal direction) orthogonal to the longitudinal direction, and accordingly, is elastically deformable.

On one surface 16a which is on the inner side where the operation portions 16 of the arm members 2 oppose to each other, a contact portion 11 in a wedge shape is integrally formed with the arm members 2.

The contact portion 11 is formed in a position where tip edges 11a are in contact with each other so that the tip edge 11a in a wedge shape extends in a vertical direction by having each tip edge 11a opposed to each other and elastically deforming the deformation portion 15 of the arm member 2.

The tip edge 11a is not in a complete acute shape but in a surface shape where the tip of wedge is chamfered.

The thickness of the surface in the forward and backward direction is preferably approximately 1 mm.

In addition, on the tip end side of each arm member 2 and outside each operation portion 16, that is, on a surface opposite to the one surface 16a where the contact portion 11 is formed, the grip portion 12 is provided.

In the grip portion 12, the thickness of the arm members 2 in a horizontal direction is thicker, and the side surface of the horizontal direction seen from the top is formed in a concave arc shape.

The stripper 10 of the embodiment is preferably supplied as a molding product where a plurality of strippers 10 are connected to one runner through a gate so that a plurality of strippers 10 are formed by a single molding.

The product may be supplied in a state where the stripper 10 is connected to the runner and may be supplied after the stripper 10 is separated from the runner.

Next, using the stripper 10 of the embodiment, a process of removing a coating from the optical fiber 61 will be described.

Figure 5A:
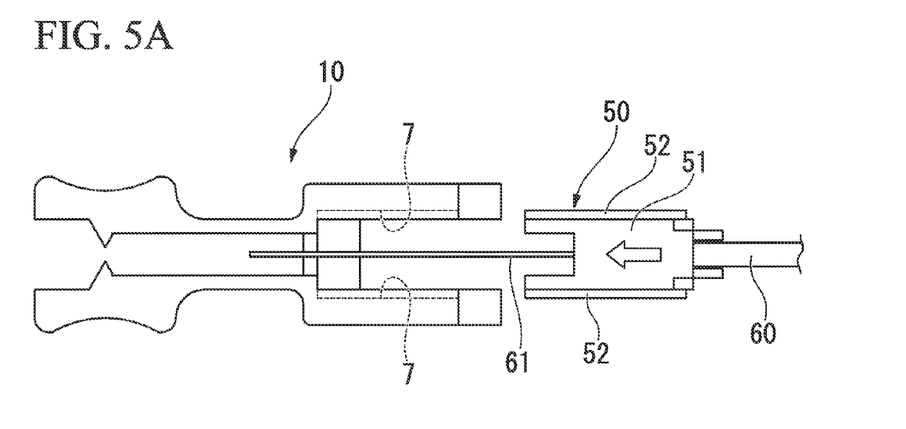
FIG. 5A is a schematic plan view illustrating an operation of a stripper and a state that a connector-attached optical fiber is inserted into the stripper.

When removing a coating from the optical fiber 61, as illustrated in FIG. 5A, the connector-attached optical fiber 50 is inserted from the rear of the stripper 10 until the front end of the outer coat gripping member 51 is brought into contact with the rear surface 4a of the wall portions 4 so that the guide protrusion 52 of the outer coat gripping member 51 and the guide groove 7 engage each other.

Figure 5B:
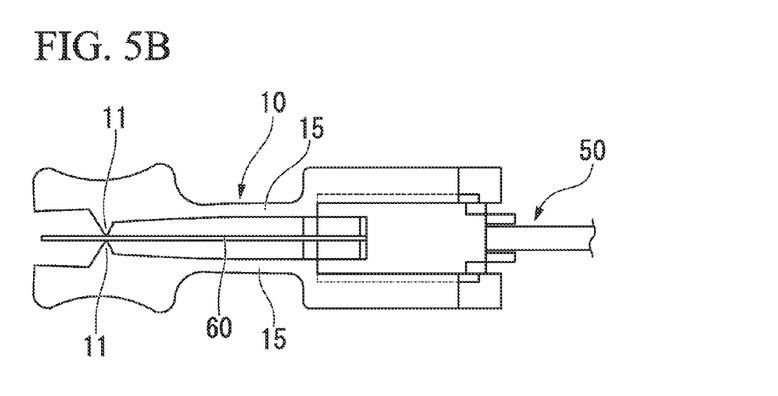
FIG. 5B is a schematic plan view illustrating the operation of the stripper and a state that the terminal portions of an optical fiber are interposed in the stripper.

Then, the grip portions 12 and 12 are gripped, and the deformation portion 15 is deformed so that the tip edges 11a of the contact portions 11 comes close to each other through the optical fiber 61.

Accordingly, each tip edge 11a of the contact portions 11 is brought into contact with the optical fiber 61 to make the tip edge 11a bite into a coating.

Figure 5C:
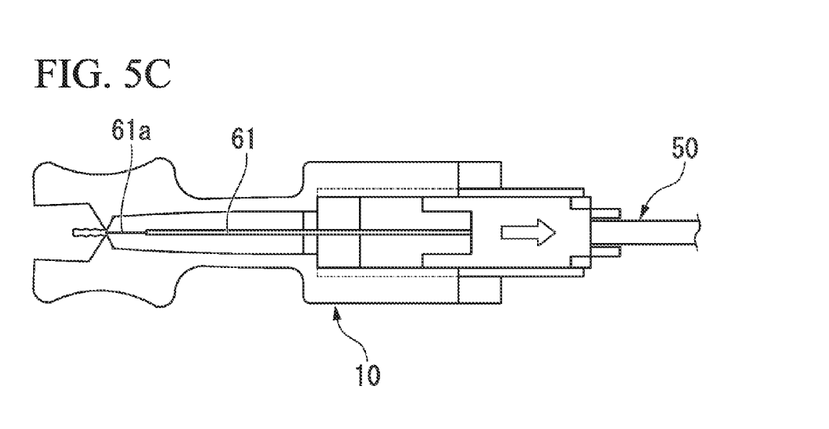
FIG. 5C is a schematic plan view illustrating the operation of the stripper and a state that a coating of the optical fiber is removed using the stripper.

In this state, as illustrated in FIG. 5C, by pulling the connector-attached optical fiber 50 backwards, a coating is pulled off and a coating is removed from the optical fiber 61.

According to the above-mentioned embodiment, it is possible to provide the stripper 10 at a low cost due to its structure of including the main body 1, the pair of arm members 2, and the contact portion 11 which are integrally formed using a resin.

In addition, by causing the outer coat gripping member 51 to abut onto the rear surface 4a of the wall portion 4, the outer coat gripping member 51 may be positioned at a position of starting a coating removal, and it is possible to make the thickness of coating which coats a bare optical fiber be constant.

The distance between the rear surface 4a of the wall portion 4 and the tip edge 11a of the contact portion 11 in a forward and backward direction is appropriately set by the specification of the optical connector which is assembled by including the outer coat gripping member 51.

Second Embodiment

Next, the second embodiment of the invention will be described in detail with reference to drawings.

The embodiment will describe a stripper used to remove a coating from the optical fiber 61 fixed to the optical fiber holder 20 (refer to FIG. 7), which is different from the stripper of the first embodiment in the shape of a main body 1B.

Figure 6:
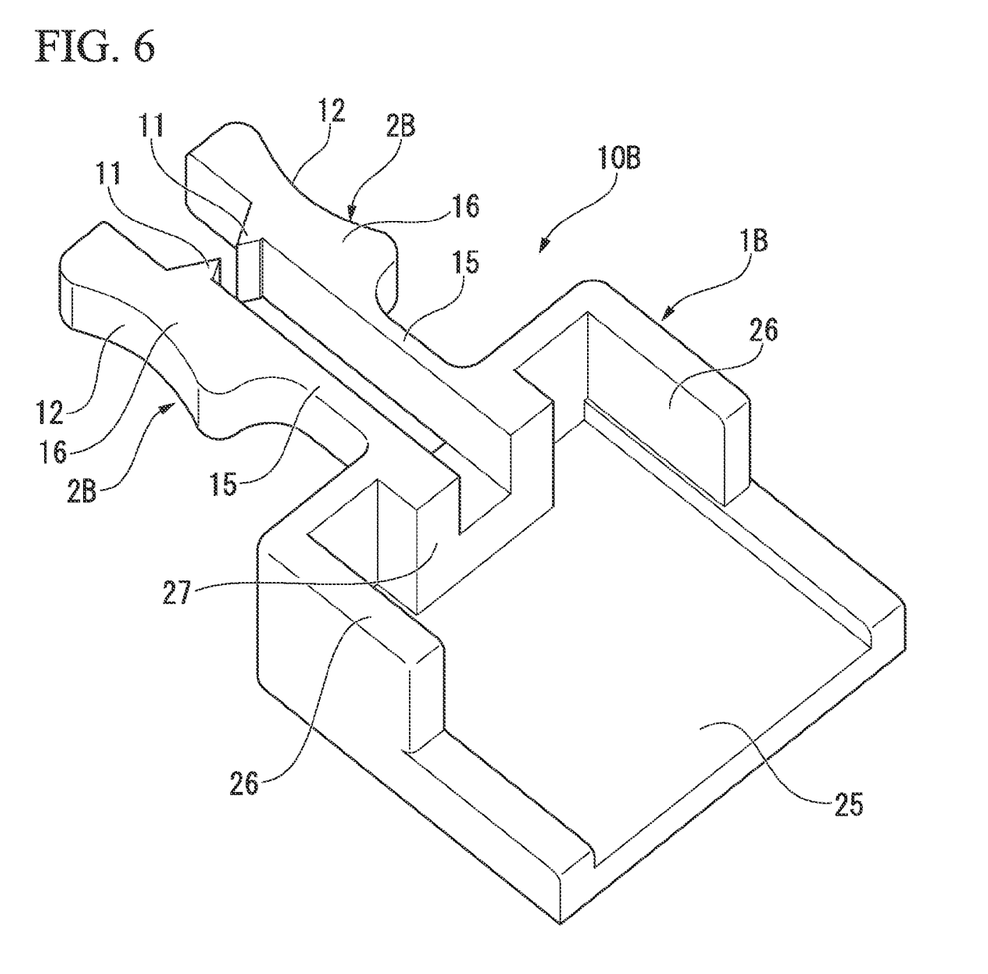
FIG. 6 is a perspective view of the stripper according to a second embodiment of the invention.

As illustrated in FIG. 6, in the main body 1B of the stripper 10B of the embodiment, an optical fiber holder 20 to be described below is loaded, and a slide portion 25 used to slide the optical fiber holder 20 is provided.

At both sides of the slide portion 25, a guide wall 26 is provided, which determines a pull-out direction of the optical fiber holder 20 by matching an external size of the optical fiber holder 20.

Figure 7:
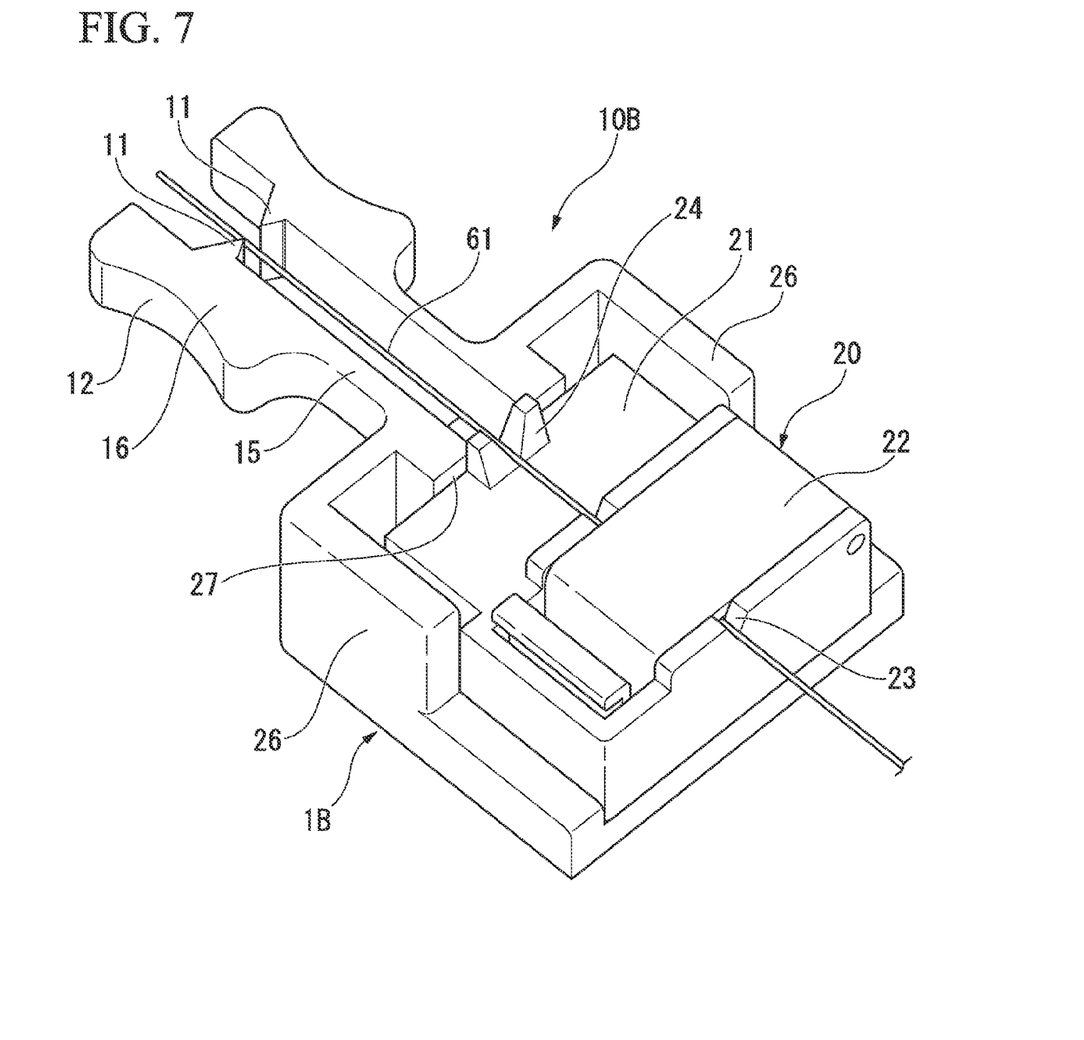
FIG. 7 is a perspective view illustrating a state that an optical fiber holder holding the optical fiber is incorporated in the stripper of the second embodiment.

Furthermore, the rear surface 27 of the arm member 2B, as illustrated in FIG. 7, when inserting the optical fiber holder 20 along the guide wall 26, functions as a stopper with which the front end of the optical fiber holder 20 is in contact.

As illustrated in FIG. 7, the optical fiber holder 20 is a holder holding the optical fiber, includes a base portion 21 and a cover 22 and grips and fixes the optical fiber 61 on the base portion 21 by pressing the optical fiber 61 against the base portion 21 using the cover 22.

The base portion 21 is formed of a synthetic resin, a metal, or the like, and is in an approximately rectangular plate shape in the illustrated example.

On the upper surface of the base portion 21, a positioning groove 23 holding the optical fiber 61 is formed in a straight line along a longitudinal direction of the base portion 21.

The positioning groove 23 in the illustrated example is in a substantially V-shaped cross section.

In addition, a positioning protrusion 24 is provided apart from the front of the base portion 21.

According to the above-mentioned embodiment, when removing a coating from the optical fiber 61 held by the optical fiber holder 20, as illustrated in FIG. 7, by gripping the grip portion 12 in a state where the optical fiber holder 20 is loaded on the slide portion 25 of the stripper 10B, the contact portion 11 is brought into contact with the optical fiber 61 to put the tip edge 11a into a coating.

By pulling backwards the optical fiber holder 20 in the same manner as a method in the first embodiment from this state, a coating is pulled off and a coating is removed from the optical fiber 61.

In addition, by causing the optical fiber holder 20 to abut onto the rear surface 27 of the arm member 2B, the optical fiber holder 20 may be positioned at a position of starting a coating removal, and it is possible to make the thickness of a coating which coats a bare optical fiber be constant.

In the above described embodiment, the optical fiber 61 is used as a coated optical fiber, but the coated optical fiber is not limited thereto. The stripper 10 and 10B in the embodiment may be used for an optical fiber having various types of coatings.

The technical scope of the invention is not limited to the embodiment described above, and, without departing from the gist of the invention, the scope of the invention can be variously modified.

For example, in each embodiment described above, the contact portion is in a wedge shape, but it is possible to change the shape to match the property of the coating of the optical fiber.

A coating removal tool used for an optical fiber and a method of removing a coating according to the invention may be widely used in a situation where a coating is removed from the terminal portions of the optical fiber.

What is claimed is:

1. A coating removal tool used for an optical fiber comprising:
   a base; and
   a pair of arm members extending in one direction from the base,
   wherein the arm members, each of which comprises an elastically deformable deformation portion on a base side, and an operation portion which is closer to a tip end side than the deformation portion,
   contact portions in a wedge shape are provided on inner sides of operation portions, respectively, the inner sides opposing to each other so that tip edges of the contact portions oppose to each other, and grip portions are provided outside the operation portions, respectively,
   a coating of the optical fiber is configured to be removed by pulling out the optical fiber in a state where the tip edges of the contact portions are brought into contact with the optical fiber disposed along an extending direction of the arm members,
   the optical fiber is led out from an optical cable and attached to an outer coat of the optical fiber, and
   a slide portion is provided on the base, the slide portion being configured to cause the outer coat gripping member to slide in a pull-out direction of the optical fiber.

2. The coating removal tool used for an optical fiber according to claim 1,
   wherein the optical fiber is led out from an optical cable and attached to an outer coat gripping member, the gripping member gripping an outer coat of the optical cable, and
   a slide portion is provided on the base, the slide portion being configured to cause the outer coat gripping member to slide in a pull-out direction of the optical fiber.

3. The coating removal tool used for an optical fiber according to claim 1,
   wherein a stopper is provided on the base, the stopper being configured to position the outer coat gripping member or the optical fiber holder at a starting position of a coating removal, and the outer coat gripping member and the optical fiber holder causing the slide portion to slide.

4. A coating removal tool used for an optical fiber comprising,
   a base; and
   a pair of arm members extending in one direction from the base,
   wherein the arm members, each of which comprises an elastically deformable deformation portion on a base side, and an operation portion which is closer to a tip end side than the deformation portion,
   contact portions in a wedge shape are provided on inner sides of operation portions, respectively, the inner sides opposing to each other so that tip edges of the contact portions oppose to each other, and grip portions are provided outside the operation portions, respectively,
   a coating of the optical fiber is configured to be removed by pulling out the optical fiber in a state where the tip edges of the contact portions are brought into contact with the optical fiber disposed along an extending direction of the arm members,
   the optical fiber is an optical fiber held by an optical fiber holder, and
   a slide portion is provided on the base, the slide portion is configured to cause the optical fiber holder to slide in a pull-out direction of the optical fiber.

5. The coating removal tool used for an optical fiber according to claim 4,
   wherein a stopper is provided on the base, the stopper being configured to position the outer coat gripping member or the optical fiber holder at a starting position of a coating removal, and the outer coat gripping member and the optical fiber holder causing the slide portion to slide.

6. A method of removing a coating, the method comprising:
   disposing, between a pair of arm members extending in one direction from the base including a slide portion thereof, an optical fiber along an extending direction of the arm members, the optical fiber being led out from an optical cable and attached to an outer coat gripping member, the gripping member gripping an outer coat of the optical cable, the slide portion being configured to cause the outer coat gripping member to slide in a pull-out direction of the optical fiber;
   gripping grip portions provided outside operation portions, each operation portion being formed closer to a tip end side than an elastically deformable deformation portion on a base side of the pair of arm members;
   deforming deformation portions so that tip edges of contact portions in a wedge shape come close to each other through the optical fiber, the contact portions being provided on sides of operation portions, respectively, so as to oppose each other;
   allowing tip edges of the contact portions to come into contact with the optical fiber; and
   removing a coating of the optical fiber by sliding the gripping member in the pull-out direction of the optical fiber in a state where the contact portions are brought into contact with the optical fiber.

7. A method of removing a coating, the method comprising:
   disposing, between a pair of arm members extending in one direction from the base including a slide portion thereon, an optical fiber along an extending direction of the arm member, the optical fiber being held by an optical fiber holder, the slide portion being configured to cause the optical fiber holder to slide in a pull-out direction of the optical fiber;
   gripping grip portions provided outside operation portions, each operation portion being formed closer to a tip end side than an elastically deformable deformation portion on a base side of the pair of arm members;
   deforming deformation portions so that tip edges of contact portions in a wedge shape come close to each other through the optical fiber, the contact portions being provided on sides of operation portions, respectively, so as to oppose each other;
   allowing tip edges of the contact portions to come into contact with the optical fiber; and
   removing a coating of the optical fiber by sliding the optical fiber holder in the pull-out direction of the optical fiber in a state where the contact portions are brought into contact with the optical fiber.

* * * * *